Aug. 7, 1956  F. E. SMITH  2,757,644
STEAM ENGINE
Filed Sept. 2, 1950  8 Sheets-Sheet 1

Fig. 1.

1st STAGE ON FORWARD STROKE EXHAUSTS INTO 2ND STAGE ON REVERSE STROKE ATMOSPHERIC PRESSURE ON FORWARD STROKE AGAINST VACUUM

INVENTOR.
FRANK E. SMITH
BY
John L. Seymour
ATTORNEY

INVENTOR.
FRANK E. SMITH
BY
ATTORNEY.

Aug. 7, 1956 F. E. SMITH 2,757,644
STEAM ENGINE
Filed Sept. 2, 1950 8 Sheets-Sheet 7

Fig. 12.

INVENTOR.
FRANK E. SMITH
BY
John L. Seymour
ATTORNEY

Aug. 7, 1956  F. E. SMITH  2,757,644
STEAM ENGINE
Filed Sept. 2, 1950  8 Sheets-Sheet 8

Fig. 13.

INVENTOR.
FRANK E. SMITH
BY
John R. Seymour
ATTORNEY

2,757,644
Patented Aug. 7, 1956

2,757,644

STEAM ENGINE

Frank E. Smith, Niagara Falls, N. Y.

Application September 2, 1950, Serial No. 182,988

20 Claims. (Cl. 121—109)

This invention relates to expansible chamber engines such as those which are operated by steam, by other compressed gases such as air or burning fuel, and particularly to reciprocating engines. The invention is particularly related to multiple expansion engines, in which the compressed gas undergoes a plurality of expansions before being exhausted.

It is an object of the invention to extract more power from the energy available in compressed gases, particularly from hot compressed gases, than can be extracted by known engines.

Another object is to improve the thermodynamics of the heat engine.

Another object is to improve the thermodynamics of expansible chamber engines by means of a new engine operating on a new cycle of increased efficiency.

Another object of the invention is to improve the thermodynamics of the reciprocating engine, particularly the thermodynamics of the multiple expansion reciprocating engine.

A further object is to provide an engine having a cycle truly individual and unique, different from, and an improvement over, the known successful cycles such as the Carnot and the Otto.

Inasmuch as the principles and advantages of an engine can be derived only with the greatest difficulty from an inspection of the engine itself it is necessary to introduce this subject with a general discussion of certain basic principles. In this specification steam will be used to illustrate the general principles.

Engineers have for years employed the difference in enthalpy values, $h_1-h_2$ as the maximum available power when a hot gas such as steam is expanded from a higher to a lower pressure. This conclusion was developed from the Carnot cycle, wherein gas is compressed within an engine and expanded in the same engine for the delivery of power. In that case no work is performed to expel the compressed gas from the engine and no work is recovered from the displacement volume acting on the piston on the power recovery cycle. Carnot shows that the maximum recovery from that cycle is $Q-Q_r$ where $Q$ is the energy at intake and $Q_r$ is the energy at exhaust level. He deals with the expansion of a gas and does not include displacement power.

It is an object of this invention to present an engine having a cycle which has improved recovery of displacement power, as well as expansion power.

Carnot shows that $Q$ and $Q_r$ are functions of the temperature $T$ and $T_r \times C_p$ where $C_p$ is the specific heat at constant pressure. Since enthalpy values are functions of temperature and the specific heat of a particular gas then $Q$ and $Q_r$ are equal to $h_1$ and $h_2$ respectively, which is correct for the Carnot type engine but incorrect for engines which receive steam from a boiler. Such engines can receive a volume of steam equal to the intake at the fixed pressur to the point of cutoff without any change in its enthalpy value and deliver power equal to the movement of the piston. This is displacement energy, which is stored energy available for recovery as mechanical power; its enthalpy value does not fall until it starts to expand. The displacement energy from a steam boiler comes from the energy required to pump the water into the boiler, the energy stored by the volume increase supplied by the heat of vaporization (very many times), and from the heat supplied to increase the volume from that of saturation steam to that of superheated steam.

Figure 1:
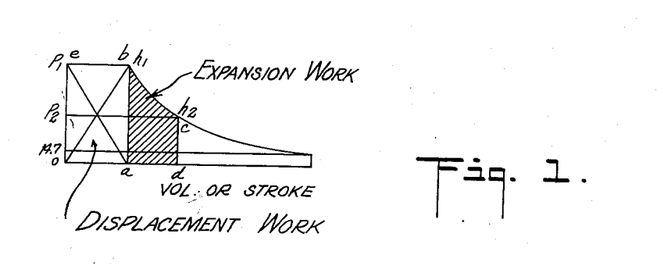
Fig 1 is a pressure-work diagram, or indicator diagram, illustrative of the discussion of principles.

Referring to the work diagram of Fig. 1, which has been calculated to absolute zero pressure, the vertical axis being pressure and the horizontal being volume or stroke, in the expansion of pressure $P_1$ to pressure $P_2$ the work of expansion $a$, $b$, $c$, $d$ approaches the enthalpy value of $h_1-h_2$. In the superheated region where there is no condensing of steam the recovery of mechanical work is represented by $$\frac{h_1-h_2}{K} \cdot K = \frac{cP}{cv}$$

the specific heat a constant pressure over the specific heat at constant volume. In the zone below the saturation line there is 11% more power available, because the condensing steam supplies additional power by maintaining a volume greater than it would be by adiabatic expansion. The recovered power of displacement is reported by the area $o$, $e$, $b$, $a$, which, plus the energy of expansion, is appreciably greater than the energy values $h_1-h_2$.

It is an object of this invention to present an engine and a cycle capable of transforming this extra energy into mechanical power. The following examples of available energy illustrate the point.

Case I:

B. t. u.
$P_1=610$ p. s. i. a. 1100° F., $S=1.75$ enthalpy__ 1570
$P_2=15$ p. s. i. a. 212° F., $S=1.75$ enthalpy__ 1147

$h_1-h_2=423$

B. t. u.
Displacement power__________ 169.5
Expansion power____________ 333.2

Total __________________ 502.7

Equal to 119% of $h_1-h_2$.

Case II:

B. t. u.
$P_1=100$ p. s. i. a. 330° F., $S=1.60$ enthalpy__ 1185
$P_2=15$ p. s. i. a. 212° F., $S=1.60$ enthalpy__ 1046

$h_1-h_2=139$

B. t. u.
Displacement power__________ 81.4
Expansion power____________ 121.1

Total __________________ 202.5

Equal to 141% of $h_1-h_2$.

By the application of the principles of this invention a horsepower hour can be delivered by about 5 to 6 pounds of steam, which is appreciably lower than with known equipment. Heretofore, in attempting to improve the steam engine, engineers have gone to higher temperatures and higher pressures, but this invention derives more power from gases at stated temperature and pressure than could be derived by prior type engines.

The invention involves a reciprocating engine in which more than one stage of the expansion is carried out upon a single piston.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

Fig. 6 is a vertical elevational view, partly in section, of a steam engine constructed in accordance with the principles of the invention;

Figure 7:
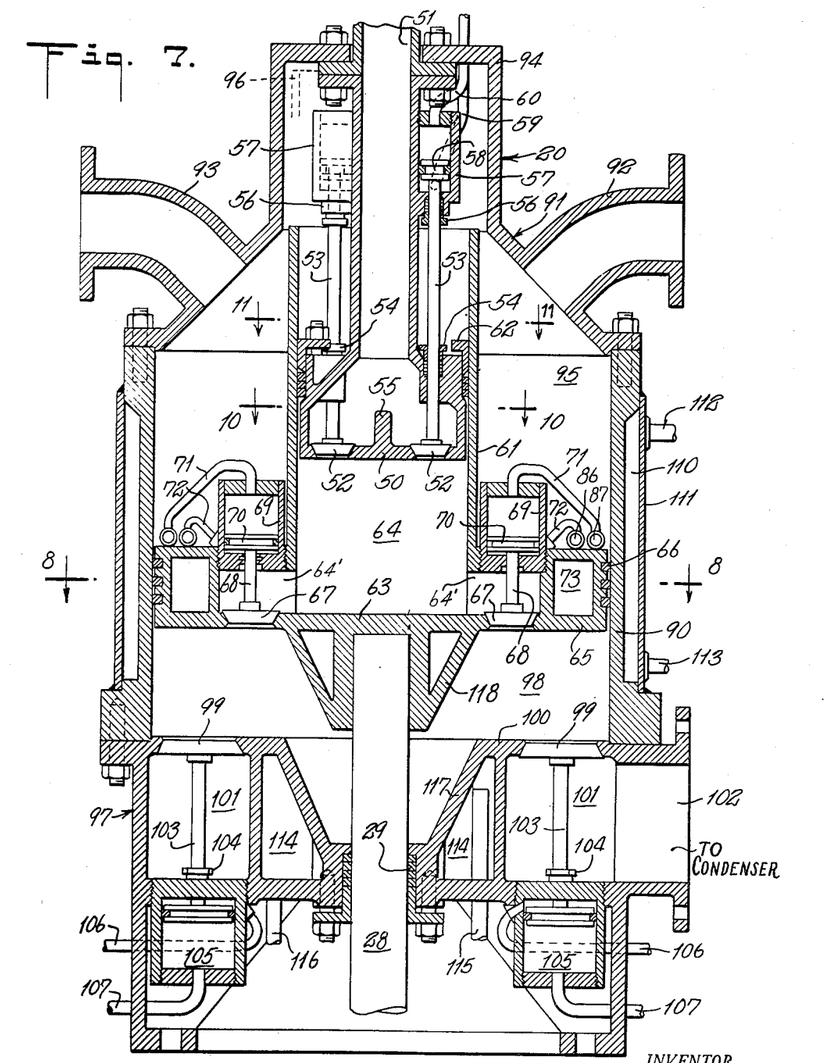
Fig. 7 is a vertical section through the upper part of the engine of Fig. 6 taken on the line 7—7 of Fig. 8.

Referring now to Figs. 6 and 7, 20 indicates generally a vertical reciprocating steam engine having a base 21 within which is a crank shaft 22 which is driven by a connecting rod 23 that is seated by a bearing 24 on the crank of the crank shaft and is connected at its upper end by a bearing 25 to the connecting rod pin 26 in the cross head 27 attached to the end of piston rod 28 which emerges from a steam chamber of the engine through an ordinary packing gland 29. A cam shaft 30 is driven by a chain drive 31 from the crank shaft 22 (see also Fig. 12) and this cam shaft is rotatably and slidably mounted in bearings 32 for limited axial sliding movement. The cam shaft is connected to the chain drive 31 by a splined connection 33 and its axial position is controlled at its other end by means of a slidable, non-rotary shaft 34 to which it is coupled at 35 for relative rotary movement. The shaft 34 has a screw thread 36 to which a pinion 37 is threaded so that rotation of the pinion moves the shaft 34 axially one way or the other, and this axial movement moves the shaft 30 and with it the cams 38, 39, 38', 39' which respectively control the intake and exhaust valves of adjacent engines of a battery shown in Fig. 13.

The cam 38 has a diagonal face 40, so that the axial motion of the cam shaft 30 changes the time at which cam follower 41' is activated and the intake control valve 41 gives admission and cutoff of steam to the cylinder. The exhaust valve 39 has a cam all faces of which are parallel to the axis of the shaft so that the time of exhaust from the engine is not altered by the axial motion of the shaft. Both cams are manually adjustable angularly about the shaft.

There is also shown as a part of Figs. 12 and 13 a mechanism for determining the axial position of the shaft and hence the moment of intake and cutoff, but that apparatus will be described in detail later.

The intake valve 41 and exhaust valve 42 may be of standard manufacture; they are usually called pilot valves and they deliver pressure by a suitable fluid to one side or the other of the actual inlet or exhaust valves of the engine; they are made by various manufacturers of which Ross Valve Company is one.

The connections from these control or pilot valves to the operating valves of the engine will be described after the construction of the engine itself has been made clear.

Referring mainly to Fig. 7, a fixed piston 50 of hollow construction receives high pressure steam through a steam line 51. Three valves 52 (see also Fig. 10), have stems 53 that enter the enlarged head of the piston 50 through packing glands 54. These valves are arranged at 120° from each other between the ribs of bracing spider 55. The valve stems 53 pass through packing glands 56 and into cylinders 57 which contain pistons 58 to which they are attached. Inlet lines 59 open on one side of pistons 58 and exhaust lines 60 on the other side. These lines are supplied by valve 41 (Fig. 6) with fluid under sufficient pressure to open and close the valves at the times demanded by the cycle of the engine. When fluid pressure is applied through line 59 the valve 52 is opened by movement of piston 58 and at the same time valve 41 permits line 60 to be exhausted, as will readily be understood by persons skilled in the operation of pilot valves.

A slidable cylinder 61 is mounted on the fixed piston 50 by means of a packing gland 62. This cylinder 61 has a head 63 which forms, with piston 50 and cylinder wall 61, an expansible chamber 64. When the valves 52 are open, high pressure steam flows through line 51 into chamber 64 and moves the head 63 away from piston 50, thus transmitting motion through piston rod 28 to the crank shaft.

Chamber 73 receives high pressure steam from chamber 64, through check valve 75. After the cut off of high pressure steam in the chamber 64, there is expansion (see Fig. 2) until at the end of the stroke it is about half the original pressure. When the pressure drops in the chamber 64, the check valve of Fig. 9 closes, holding chamber 73 filled with the high pressure steam. We therefore have high pressure 600 lbs. per sq. inch on the underside of piston 70 and half pressure on top of valve 67.

Figures 8, 9, 10, 11:
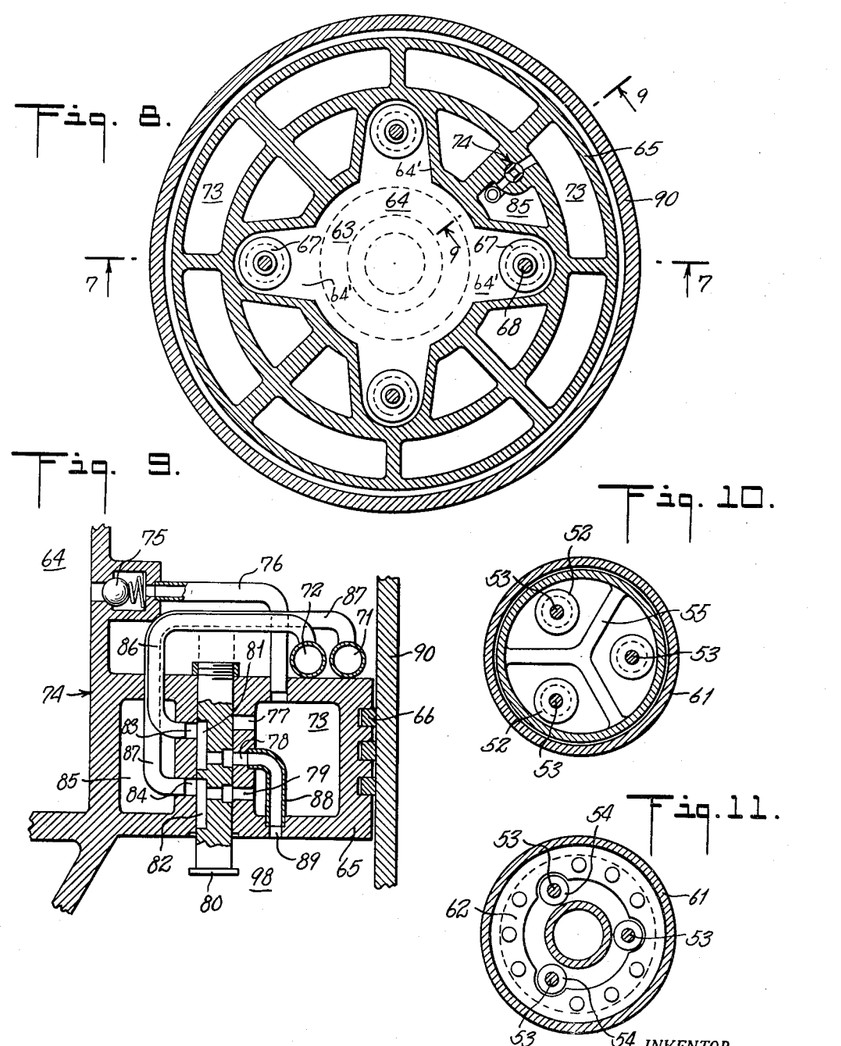
Fig. 8 is a section on the line 8—8 of Fig. 7.
Fig. 9 is a section on the line 9—9 of Fig. 8.
Fig. 10 is a section on the line 10—10 of Fig. 7.
Fig. 11 is a section on the line 11—11 of Fig. 7.

It is to be noted that the pressure in 64 does not have to be invariably one half of the original pressure because an early cut off may make it one third or a long intake of high pressure might make it two thirds of the high pressure, but in any of these cases, the high pressure itself will be fed from chamber 63 to the underside of piston 70, and the valve will open at the proper time.

With the cylinder moving up to the top position, pressure is applied through line 60 to the top of 58. Pressure is relieved on the underside of 58 through pipe 59. High pressure is on top of valve 67 and a vacuum on the underside of valve 67. At the top of the stroke, valve 52 must open, pressure sufficient to overcome the high pressure on top of valve 52 is applied to the underside of piston 58 through pipe 59, and the pressure is relieved on the top of piston 58 through valve 60. Lines 59 and 60 lead to valves 41 and 42 which are shown in Figs. 12 and 6.

Referring also to Fig. 8, the end of cylinder 61 is developed into a piston 65 having piston rings 66 for engagement with the wall of a circumscribing cylinder 90 and having four valves 67 which have seats in head 63 and stems 68 that pass through appropriate glands into cylinders 69, being there connected to pistons 70. These valves 67 are mounted in small chambers 64' which communicate directly with the chamber 64 and are consequently subject to the pressure existing in that chamber. One side of each piston 70 is supplied by a pipe line 71 and the other side by a pipe line 72 both of which are connectible to circumferential chamber 73 in the head by a valve mechanism 74 indicated in Figs. 8 and 9. The operation of the valve mechanism is as follows.

Chambers 73 are formed adjacent the outer rim of the piston 65, are interconnected, and receive steam from chamber 64 through spring pressed ball valve 75 and line 76. The ball valve seals the pressure in chamber 73 when the chamber 64 is being scavenged. Three valve ports 77, 78, 79 are provided in the wall of chamber 73 and slide valve 80 has appropriately spaced ports 81, 82 of L-shape which make alternate contact with ports 77—78 and 78—79 respectively, on the one side, and with 83, 84 in the wall of chamber 85 on the other side, the ports 83, 84 being connected by lines 86, 87 to lines 71, 72 which control the position of piston 70. The valve 80 is of striker type and is moved by hitting appropriately placed obstructions at each end of the piston's stroke. At one end it strikes the piston head and at the other a projection from the air chamber wall.

A recess may be provided in the piston head to give delayed discharge if desired.

In the position shown in Fig. 9, the piston 65, 74 has reached the end of its up stroke and the valve 80 has been knocked down to the position indicated and the high pressure steam from chamber 73 is flowing through ports 79, 82, 84 and lines 87, 71 to the upper end of all cylinders 69, closing the valves 67. At the same time, the lower part of the cylinder 69 is being exhausted through lines 72, 86 and ports 83, 81, 78 and pipe 88 (Fig. 9) and port 89 to the low pressure face of piston 65. When the piston 65 reaches the other end of its stroke the valve 80 is knocked upward, connecting the lower faces of pistons 70 with the high pressure in chamber 73 and exhausting the upper faces of pistons 80.

The piston 65 makes sealing contact through rings 66 with a circumscribing cylindrical wall 90 to which, at its upper end, is attached a head 91 having ports 92, 93 for the admission and discharge of air or other fluid, and an extension 94 which covers the valve operating mechanism 57. There is thus formed a chamber 95 within which the cylinder 61 moves, reaching the dotted line position 96 at the upper end of its stroke. At the end of its down stroke the face of piston 65 closely approaches the corresponding face of head 97 which is attached to cylinder wall 90 and forms with it and piston 65 a low pressure chamber 98. Valves 99 appropriately placed around the outer part of the face 100 of head 97 serve to exhaust chamber 98 at the proper time. The valves are quite large and may be of any suitable number, for instance 6. These valves open into a chamber 101 circumscribing the head 97 and opening through exhaust port 102 to a condenser. The condenser employed is not shown but may be of any satisfactory type employed in steam engineering to produce a pressure lower than 15 p. s. i. a. Pressures as low as 1 p. s. i. a. may be employed conveniently and, although the condenser used, being conventional, is not illustrated, it performs an important function in the preferred form of the invention.

The valves 99 are mounted on stems 103 which project through packing glands 104 into cylinders 105 which are served on opposite sides through lines 106, 107 from exhaust valves 42.

The construction of the engine has been sufficiently described at this point to make its structure comprehensible and its operation will now be reviewed in a general way.

The operation of the machine is started by opening the valves 52, which admit high pressure steam from the hollow interior of piston 50 to the chamber 64, forcing the movable cylinder 61, 63 away from piston 50. At a time controlled by the face 40 of cam 38 the intake valves 52 are closed and the steam acts from this point of cutoff by expansion until the head 63, 65 approaches face 100 of the head 97. The leading end of valve 80 strikes face 100, or the end of a recess therein, and opens valves 67 so that the partially expanded steam in chamber 64 is quickly discharged into chamber 98. During the low pressure stroke the pressure on the inside of the cylinder 64 is balanced by like pressure on the central area on the outside thereof so that the pressure within chamber 64 may be reckoned at substantially zero during the return or up stroke, resulting in perfect scavenging without back pressure. As the upper stroke is completed the valve 80 is reversed by contact with appropriate abutments, closing valves 67. At about the same time the valves 99 are opened by pilot valves 42 and pilot valves 41 open valves 52.

The condenser establishes a low pressure in chamber 101 under valves 99 so that the almost completely expanded steam in chamber 98 may be described as exhausted to vacuum. The valves 99 remain open during the down stroke of piston 63, 65 until chamber 98 is substantially completely exhausted, and the high pressure steam in chamber 64 works only against vacuum pressure, closing preferably just before the valves 67 are opened by striker valve 80.

Figure 2:
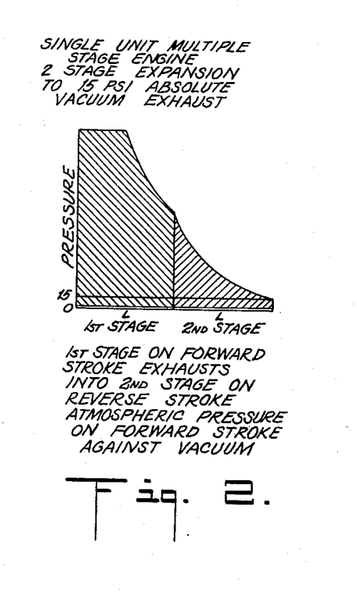
Fig. 2 is a similar indicator diagram for a multiple expansion engine having two stages of expansion constructed according to the principles of the invention.
Figure 3:
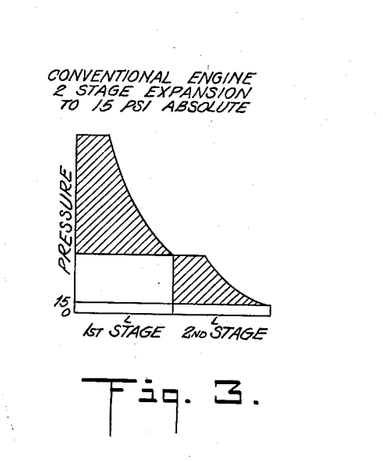
Fig. 3 is a comparative indicator diagram for a conventional engine having two stage expansion.

This operation continues, producing, in a two-stage reciprocating engine, an indicator diagram of the type shown in Fig. 2. The greater efficiency of this engine is indicated by comparing the cross hatched area with the cross hatched area in Fig. 3 which represents the indicator diagram of a conventional two-stage expansion engine. The diagram of Fig. 2 is of a single unit multiple stage engine having two-stage expansion to 15 p. s. i. a. with vacuum exhaust. The diagram of Fig. 3 is of a conventional engine having two-stage expansion to 15 p. s. i. a.

In order to still further increase the efficiency of the apparatus the cylinder wall 90 is provided with a wide exterior groove 110 which is closed by a cover 111, high pressure steam being received in this chamber through pipe 112 and condensate exhausted through pipe 113. An annular chamber 114 in head 97 receives high pressure steam through pipe 115 and exhausts it through pipe 116. These steam jackets supply some heat to the low pressure steam by the condensing of the steam in the jacket and also maintain the wall 90 at a temperature favorable to the operation of the rings 66. Chamber 114, which circumscribes the boss 117 performs a similar function. The hollow boss 117 receives the bracing spider 118 into which the piston rod 28 is screw threaded.

Figure 12:
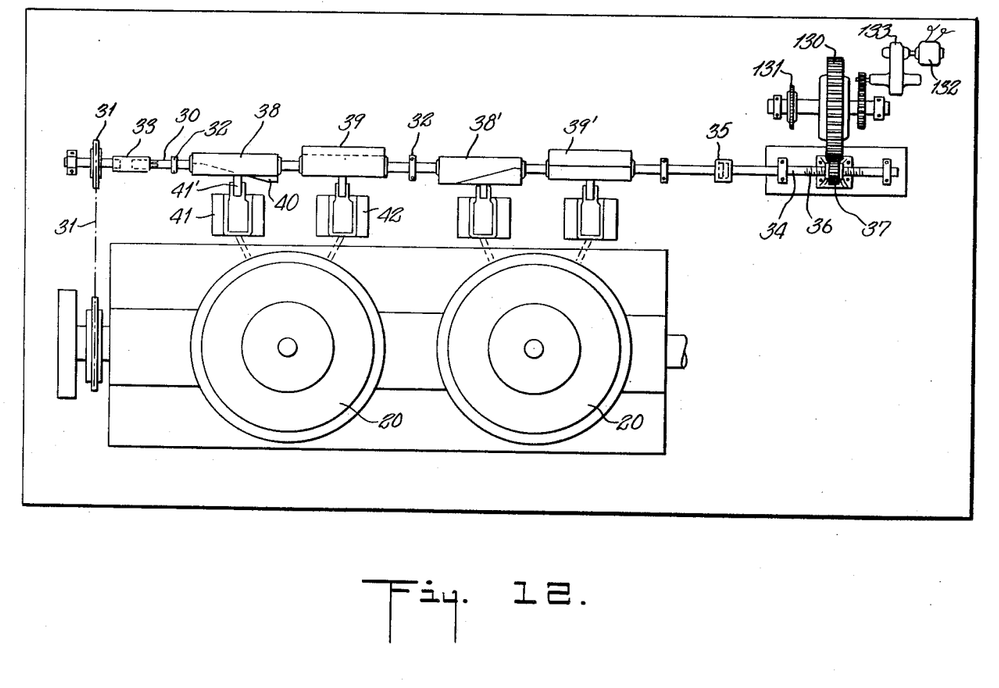
Fig. 12 is a plan diagram of the battery of Fig. 13.
Figure 13:
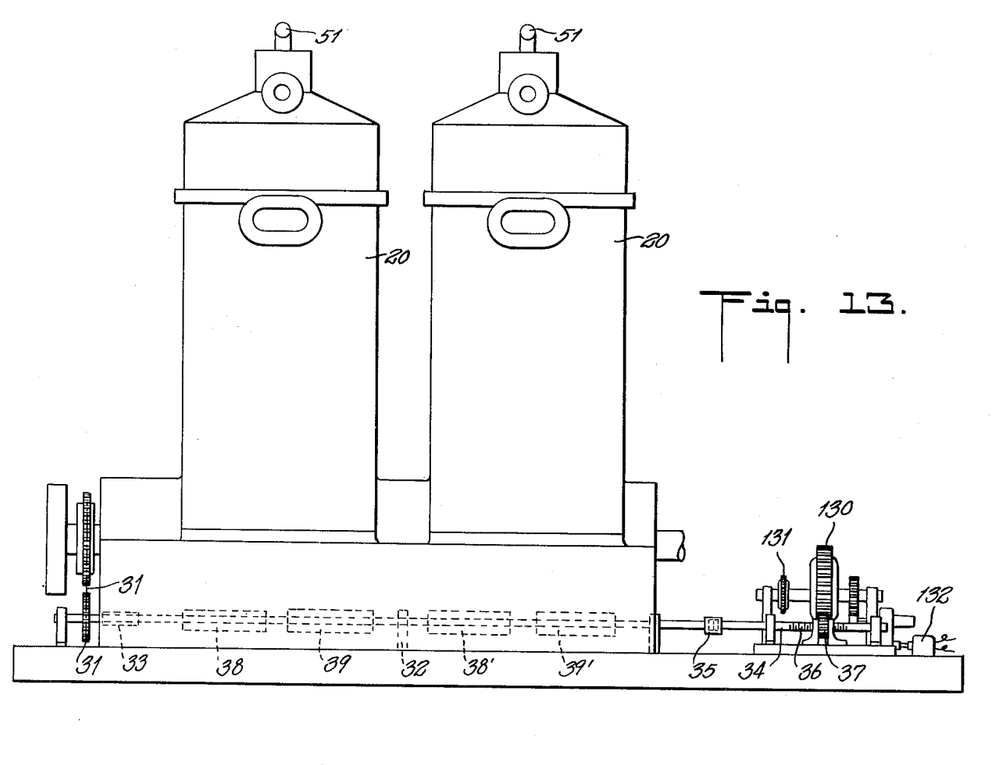
Fig. 13 is an elevational diagram of a battery of engines driving the same crank shaft.

When several of the engines are connected in batteries, as indicated in Figs. 12 and 13 the chambers 95 of each engine are interconnected through headers 92, 93 and the heat of those chambers is conserved. The setting of the cams on the shaft provides for a progressive and continuous flow of power from the several engines, as indicated by the placing of cams 38, 38' in Fig. 12.

In Fig. 12 is shown a differential drive for adjusting the positions of the cam shaft. The shaft itself is directly driven from the crank shaft by drive 31, and is connected by coupling 35 to shaft 34 which has a screw 36 within internally screw threaded gear 37, which meshes with gear 130 which is the ring gear of a differential. The differential is driven on one side from the crankshaft by drive 131 and on the other side by a motor 132 through reduction gear 133. The motor is supplied with power by a generator, not shown, driven by the engine. When load is released the engine speeds up, more current reaches motor 132, which goes faster and produces differential rotation in a direction correcting the condition by altering the position of the valve operating cams 40, and vice versa. The ring gear of the differential normally stands still, the two sides running in opposite directions at equal speeds produced by the engine, which drives one side and the timing motor which drives the other. If the engine accelerates or slows down the ring gear turns and moves the shaft lengthwise in the proper direction to correct the condition by altering the timing of the cams. If the unit is on an A. C. line the motor will be synchronous and cut into the main circuit and will hold the engine in synchronism with the circuit.

Figure 4:
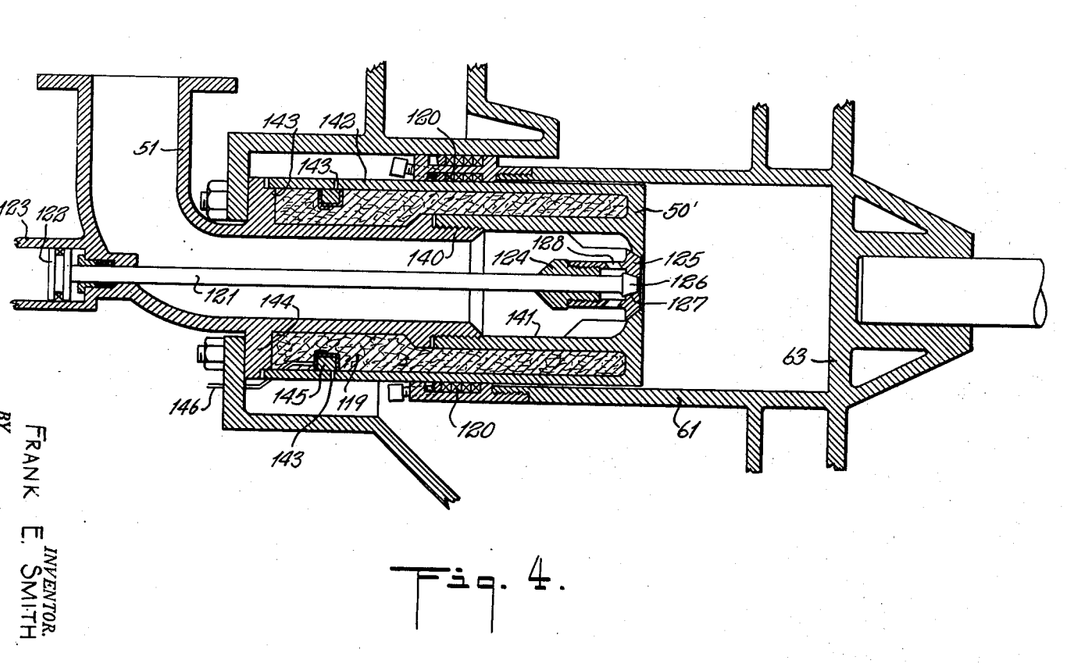
Fig. 4 is a longitudinal section through a preferred form of piston and high pressure inlet valve and associated construction.

In Fig. 4 is shown a modified and preferred form of high pressure valve. In this form of the invention the fixed piston 50' is connected with the high pressure steam header 51 and is provided with insulation 119 which prevents loss of high pressure heat. The steam line 51 is screw threaded at 140 and receives the screw threaded end of inner cylinder 141 of piston 50', the outer cylinder of which, 142, extends rearwardly, forming an annulus that can be filled with insulation, and engaging over a shoulder 143 on the flange 144 of line 51. An oil ring 145 receives oil through line 146 and distributes it to wall 142 and rings 120 through openings 143.

The cylinder 61 slides over the piston 50' and is provided with packing 120, which is not exposed to contact with the hot steam line 51. A single valve stem 121 is connected to piston 122 in cylinder 123, which is operated in a manner already described for inlet valves. The valve stem carries a slidable sleeve 124 on which is screw threaded the primary valve 125 of relatively large area which is seated in the head of piston 50'. A relatively small valve seat 126 is formed on the end of stem 121 and is received in a seat 127 in valve 125. Ports 128 give access through the shank of valve 125 to the head of valve 126. When the valve is opened the by-pass valve opens first, being comparatively easy to open, thus providing a by-pass for steam through port 128 and seat 127 into the high pressure cylinder, reducing the pressure difference on the opposite faces of valve 125 and permitting that valve to be opened by contact of the enlarged head 126 of stem 121 with the sleeve 124.

Figure 5:
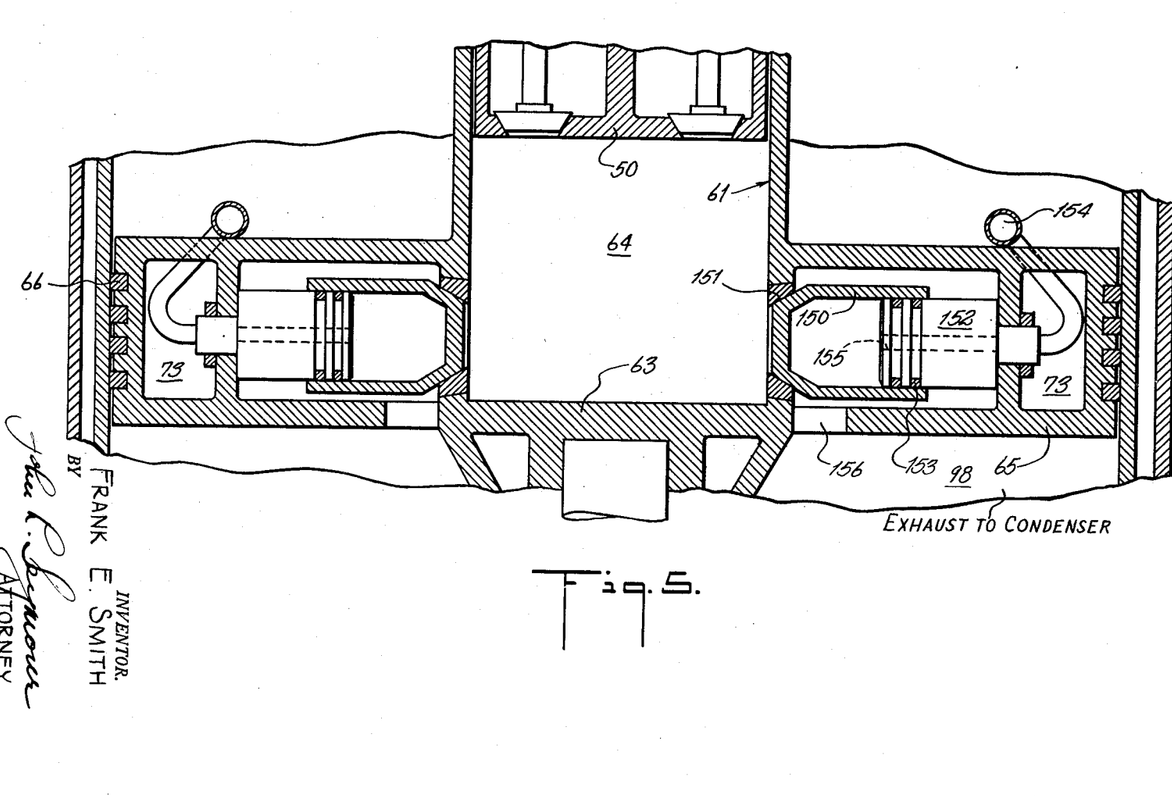
Fig. 5 is a longitudinal section through a modified novel piston, showing a novel valve.

In the modified construction shown in Fig. 5, the cylinder 61 having an internal head 63 as hereinabove described, and having a circumferential chamber 73 as described, is provided with a plurality of exhaust valves 150 which are seated in valve seats 151 in the wall of cylinder 61. These valves 150 are themselves cylinders engaged over fixed pistons 152 and sealed by rings 153. A high pressure line 154 delivers high pressure gas to the interior of cylinder valve 150 through a tube 155 in fixed piston 152. When the high pressure is turned on, as hereinabove described, the cylinder valve 150 engages valve seat 151 and seals the pressure inside chamber 64. At the moment of discharge the pressure inside cylinder 150 is released and the pressure in chamber 64 forces the valve open and escapes through opening 156 into chamber 98. This type of valve is believed to be novel per se.

An advantage of the invention is the product of a new cycle of increased efficiency for the employment of hot expansible gases. This cycle produces greater thermodynamic efficiency and a greater recovery of useful work from a given quantum of potential energy. The engine hereinabove described is very small compared to multiple expansion engines of the prior art, this economy in spacing being of the very greatest value and arising not only from the novelty of the cycle but from the employment of the new principle of multiple expansion of hot gas within a single cylinder.

A six cylinder battery having a 42" low pressure piston and a 12" high pressure piston will deliver about 15,000 H. P. at 300 R. P. M. The unit is calculated to give about 3½ H. P. per cubic foot, or ten times that yielded by a good diesel engine of advanced construction, which is on the order of 0.35 H. P. per cubic foot.

The steam jackets can be used to heat boiler feed water.

As many apparently widely different embodiments of the present invention may be made without departing from the spirit and scope thereon, it is to be understood that the invention is not limited to the specific embodiments.

What is claimed is:

1. An engine comprising hollow piston means and movable cylinder means having an open end engaged thereover forming between them a high pressure expansible chamber, valve means in the piston means adapted to admit gas under pressure from the hollow in said piston means to said chamber, larger cylinder means enclosing said cylinder means and having a cylinder wall and a first and a second opposed heads, piston means on said movable cylinder means engaged with said wall and forming with the first said head an expansible chamber and with the second an air chamber enclosing the open end of said movable cylinder, contact operated valve means in the movable cylinder-piston adapted to communicate between the said expansible chambers, valve means in the first said head, condenser means connected with said first head valve means, steam jackets encircling the said wall, the said movable piston and a part of the first said head, and a piston rod passing through the first said head and connector to said movable piston cylinder.

2. An engine comprising hollow piston means and movable cylinder means having an open end engaged thereover forming between them a high pressure expansible chamber, valve means in the piston means adapted to admit gas under pressure from the hollow in said piston means to said chamber, large cylinder means enclosing said cylinder means and having a cylinder wall and first and second opposed heads, piston means on said movable cylinder means engaged with said wall and forming with said first head an expansible chamber and with the second head an air chamber enclosing the open end of said movable cylinder-piston, valve means adapted to communicate between the said expansible chambers, valve means in the first said head, condenser means connected with said first head valve means, and a piston rod passing through said first head and connected to said movable piston-cylinder.

3. An engine comprising hollow piston means and movable cylinder means having an open end engaged thereover forming between them a high pressure expansible chamber, valve means in the piston means adapted to admit gas under pressure from the hollow in said piston means to said chamber, larger cylinder means enclosing said cylinder means and having a cylinder wall and first and second opposed heads, piston means on said movable cylinder means engaged with said wall and forming with the first said head an expansible chamber and with the second an air chamber enclosing the open end of said movable cylinder, contact operated valve means in the movable cylinder-piston adapted to communicate between the said expansible chambers, valve means in the first said head, condenser means connected with said first head valve means, steam jackets encircling the said wall, the said movable piston and a part of the first said head, and a piston rod passing through said first head and connected to said movable piston-cylinder.

4. An engine comprising piston means and movable cylinder means engaged therewith forming between them an expansible chamber, valve means adapted to admit gas under pressure to said chamber, cylinder means enclosing said cylinder means and having a cylindrical wall in sliding engagement with piston means on said movable cylinder means and forming therewith a second expansible chamber, valve means in the movable cylinder piston adapted to communicate between the said expansible chambers, valve means in the second expansible chamber, vacuum condenser means connected with the valve means in the second expansible chamber, and power transmission means driven by said movable piston cylinder.

5. An engine constructed and arranged for the utilization of gas under pressure including piston means, movable cylinder means telescoped thereover constituting with said piston a first expansible chamber, cylinder means telescoped over said movable means and constituting therewith a second expansible chamber, a source of gas under pressure, valve means connecting the first chamber to said source, valve means connecting the second chamber to the first chamber, a vacuum space, and valve means connecting the second chamber to the vacuum space.

6. An expansible chamber engine of multiple chamber type having opposed expansible chambers, a movable piston comprising the wall between said chambers, valve means in said piston adapted to discharge gas from one side of said piston to the other side, fluid pressure operated means to operate said valve means, and timing means to activate said pressure operated means.

7. An expansible chamber engine having higher pressure and lower pressure opposed expansible chambers separated by a movable piston, valve means, interposed between the high and low pressure sides of said piston, opening at the end of the high pressure stroke, vacuum-creating condenser means, and valve means, interposed between the lower pressure chamber and said condenser means, opening at the end of the low pressure stroke.

8. An expansible chamber engine having the following cycle: intake at full pressure, expansion of gas at high pressure, discharge of the expanded high pressure gas and its simultaneous expansion at low pressure with simultaneous and substantially complete scavenging of the high pressure space into the low pressure space, intake at full pressure, simultaneous expansion of gas at high pressure and scavenging of the low pressure space into a space of subatmospheric pressure, and one way flow of the gas from the intake end of the engine to the final scavenging.

9. An expansible chamber engine having a high pressure expansible chamber, a low pressure expansible chamber, a piston, and a vacuum chamber, and having a cycle, composed of a single piston stroke in which there is simultaneous filling of the high pressure chamber with high pressure gas, partial expansion of the gas, and exhaustion of the low pressure chamber into the vacuum chamber, and a subsequent piston stroke in which there is filling of the low pressure chamber from the high pressure chamber and simultaneous, substantially complete scavenging of the high pressure chamber into the low pressure chamber, said high pressure chamber having an inlet port at one end and an outlet port at the opposite end of which the latter comprises the inlet port for the low pressure chamber.

10. The engine cycle, in which an expansible gas is admitted to an expansible chamber having a movable part, is cut off, and is partially expanded against the movable part of the chamber against vacuum back pressure, and is then admitted to the opposite side of said movable part and by continued expansion returns it to its original position, said gas being discharged from said chamber through a port in said movable part and remote from its place of admission, said discharge port being used exclusively for exhaust gases.

11. In an expansible chamber engine a piston, pressure chambers of different diameter on opposite sides of the piston, valve means in the piston, fluid pressure means to operate the valve means, and means to activate the pressure means to change the setting of the valve means at each end of the piston stroke.

12. In an expansible chamber engine a piston, a high pressure chamber on one side of the piston, a lower pressure chamber on the other side of the piston, said chambers having cylindrical, concentric, overlapped walls, said piston being the common end wall to both chambers, means to connect the chambers consisting of valve means in the piston, means to open the valve means at the end of a high pressure stroke, vacuum means, valve means to connect the lower pressure chamber and the vacuum means, and means to open the said last named valve means at the end of a low pressure stroke.

13. In an expansible chamber engine a piston, a high pressure chamber on one side of the piston, high pressure gas controlling valve means opening into said chamber, high pressure gas conduit means communicating with said valve means, a lower pressure chamber on the opposite side of said piston, means to connect said chambers including valve means, vacuum producing condenser means, valve means connecting the lower pressure chamber with the vacuum producing condenser means, means to open the high pressure valve means at the start of a high pressure stroke, means to close the high pressure valve means, means to open the valve in said means to connect at the end of a high pressure stroke and means to close said valve means at the end of a low pressure stroke, means to open the valve means connecting with the condenser means at the start of a high pressure stroke, and means to close the condenser valve means at the start of a low pressure stroke.

14. A multiple expansion reciprocating engine wherein the multiple expansion occurs in one main cylinder in which the back pressure against the high pressure stroke is a vacuum, and in which the gas under pressure is admitted through a valve maintained around the intake temperature of the gas, and is discharged through another valve maintained around the discharge temperature of the gas.

15. A multiple expansion engine having opposed, fixed heads, a high pressure cylinder and a low pressure cylinder in telescoped relation between the heads, a movable piston reciprocable between said heads and forming the end wall of each said cylinder, the high pressure cylinder being reciprocable within the low pressure cylinder, valve means in one head to supply high pressure steam to the high pressure cylinder to energize the high pressure stroke, first valve means, in the movable piston, directly connecting the high pressure and low pressure cylinders, means to open the said valve means at about the end of the high pressure stroke and to close it at about the end of the low pressure stroke, a vacuum chamber, a second valve means, in the other of said heads, connecting the vacuum chamber and the low pressure cylinder, and means to open said second valve means at about the end of the low pressure stroke and to close it at about the end of the high pressure stroke.

16. A multiple expansion engine having a high pressure cylinder and a low pressure cylinder in telescoped relation, the high pressure cylinder being reciprocable within the low pressure cylinder, means to supply the high pressure cylinder with gas under pressure to initiate the high pressure stroke of the engine, first valve means connecting the high pressure and low pressure cylinders, means to open the said valve means at about the end of the high pressure stroke and to close at about the end of the low pressure stroke, a vacuum chamber, a second valve means connecting the vacuum chamber and the low pressure cylinder, and means to open said second valve means at about the end of the low pressure stroke and to close it at about the end of the high pressure stroke.

17. An engine including a movable piston between a high pressure cylinder and a low pressure cylinder, a condenser, means to supply a condensable gas at high pressure to the high pressure cylinder including valve means in the high pressure cylinder head, valve means in the piston connecting the high pressure cylinder with the low pressure cylinder, means to exhaust the low pressure cylinder to the condenser including valve means in the low pressure cylinder head, said construction providing unidirectional flow of said gas from the high pressure cylinder head to the condenser, and means to apply atmospheric pressure to said piston during the exhausting of the low pressure cylinder to the condenser.

18. An engine including a movable piston between a high pressure cylinder and a low pressure cylinder, a condenser, means to supply a condensable gas at high pressure to the high pressure cylinder including valve means in the high pressure cylinder head, valve means in the piston connecting the high pressure cylinder with the low pressure cylinder, means to exhaust the low pressure cylinder to the condenser including valve means in the low pressure cylinder head, said construction providing unidirectional flow of said gas from the high pressure cylinder head to the condenser.

19. An engine including a movable piston connected on one side, at its mid-portion, to a cylinder movable over a fixed piston and forming a high pressure chamber therewith, the outer portion of its same side being exposed to atmospheric pressure, another cylinder forming with the other side of said piston a low pressure chamber, a condenser chamber connected to said low pressure chamber, a connection connecting a source of high pressure steam to said high pressure chamber, valve means in the fixed piston connecting the said connection to said high pressure chamber, valve means in the movable piston connecting the high and low pressure chambers, valve means in the low pressure chamber connecting it to the condenser chamber, and means coordinating and operating said valve means.

20. In an expansible gas engine having a piston and two pressure chambers on opposite sides thereof, means to apply high gas pressure and atmospheric pressure simultaneously to one side of the piston, means to exhaust the chamber on the opposite side to vacuum while such pressures are being applied, said piston having a valve acting to release the pressure on one side to the other side thereof, and said engine having a high pressure intake valve separate from said valve and a low pressure discharge valve apart from said piston and on opposite sides thereof.

References Cited in the file of this patent

UNITED STATES PATENTS

| | | |
|---|---|---|
| 350,446 | Richards | Oct. 5, 1886 |
| 391,941 | Brown | Oct. 30, 1888 |
| 399,524 | Hamlin | Mar. 12, 1889 |
| 505,004 | Reynolds et al. | Sept. 12, 1893 |
| 885,459 | Engler et al. | Apr. 21, 1908 |
| 1,671,838 | Norberg | May 29, 1928 |
| 1,696,984 | Trbojevich | Jan. 1, 1929 |
| 1,804,892 | Parsons | May 12, 1931 |
| 1,873,994 | Campbell | Aug. 30, 1932 |
| 1,999,493 | White | Apr. 30, 1935 |

FOREIGN PATENTS

| | | |
|---|---|---|
| 27,564 | Germany | June 7, 1884 |
| 50,999 | Germany | Feb. 26, 1890 |
| 425,851 | Germany | Feb. 27, 1926 |
| 10,591 | Great Britain | June 3, 1892 |
| 135,690 | Great Britain | Dec. 4, 1919 |